(12) United States Patent
Burnett et al.

(10) Patent No.: US 8,171,164 B2
(45) Date of Patent: May 1, 2012

(54) TARGET ROUTING BY INITIATOR (75) Inventors: Rodney Carlton Burnett, Austin, TX (US); Gerald Francis McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/262,205

(22) Filed: Oct. 31, 2008

(65) Prior Publication Data

US 2010/0115128 A1  May 6, 2010

(51) Int. Cl.
*G06F 13/00* (2006.01)

(52) U.S. Cl. ........................................ 709/245; 709/238

(58) Field of Classification Search .................. 709/245, 709/238, 220–222
See application file for complete search history.

(56) References Cited

U.S. PATENT DOCUMENTS

| 7,203,801 | B1 | 4/2007 | Sharma et al. |
| 7,380,019 | B2 * | 5/2008 | Shiga et al. ................... 709/239 |
| 7,404,037 | B1 | 7/2008 | Kiselev |
| 7,418,569 | B1 | 8/2008 | Lee et al. |
| 7,421,511 | B2 * | 9/2008 | Shiga et al. ................... 709/235 |
| 2004/0170432 | A1 * | 9/2004 | Reynolds et al. ............... 398/49 |
| 2005/0201386 | A1 * | 9/2005 | Thompson ............... 370/395.52 |
| 2006/0179261 | A1 * | 8/2006 | Rajan ............................ 711/162 |

* cited by examiner

*Primary Examiner* — Kenneth R Coulter
(74) *Attorney, Agent, or Firm* — Yee & Associates, P.C.; David A. Mims, Jr.

(57) ABSTRACT

An illustrative embodiment provides a computer-implemented method for target routing by initiator, using Internet small computer system interface. The computer-implemented method obtains a logical unit number configuration, containing a set of logical unit numbers, determines whether an initiator Internet protocol address, associated with a requester, has a mapping to a logical unit number in the set of logical unit numbers. The computer implemented method further sets a path for an input output/request from the requester to a backing file, according to the mapping, and returns success to the requester.

20 Claims, 4 Drawing Sheets

TARGET ROUTING BY INITIATOR

BACKGROUND OF THE INVENTION

1. Field of the Invention

The present invention relates generally to an improved data processing system, and, more specifically, to a computer-implemented method, a data processing system, and a computer program product for target routing by initiator using Internet small computer systems interface.

2. Description of the Related Art

In a typical system implementation, an Internet small computer systems interface (iSCSI) driver acts as an Internet small computer systems interface protocol initiator to transport small computer systems interface (SCSI) requests and responses over an Internet protocol (IP) network between a client and an Internet small computer systems interface-enabled target device, such as a storage router. The Internet small computer systems interface protocol is an Internet Engineering Task Force (IETF)-defined protocol for Internet protocol storage. More information about the Internet small computer systems interface protocol may be found at the Internet Engineering Task Force web site as document RFC3720 for the Internet Small Computer Systems Interface.

Architecturally, the Internet small computer systems interface driver combines with the client transmission control program/Internet protocol (TCP/IP) stack, network drivers, and network interface cards (NICs) to provide the same functions as a Small computer systems interface adapter driver with a host bus adapter (HBA) implementing a hardware initiator. An operating system image may run as a network installation management (NIM) diskless model using network file system (NFS) mounted file systems.

In a network installation management implementation, an Internet small computer systems interface managed endpoint is an endpoint that installs and boots over a software target exported to the managed endpoint. Current target boot and dump routing drivers require the platform to boot and dump from the same Internet small computer systems interface target device. In the existing Internet small computer systems interface device model, the Internet small computer systems interface target is mapped to a local device such as a disk or logical volume. The model requires that all space be allocated in advance, even if that space is never used.

BRIEF SUMMARY OF THE INVENTION

According to an embodiment, a computer-implemented method for target routing by initiator, using Internet small computer system interface is provided. The computer-implemented method obtains a logical unit number configuration, containing a set of logical unit numbers, determines whether an initiator Internet protocol address, associated with a requester, has a mapping to a logical unit number in the set of logical unit numbers, sets routing for an input output/request from the requester to a backing file, according to the mapping, and returns success to the requester.

According to another embodiment, a data processing system for target routing by initiator, using Internet small computer system interface is provided. The data processing system comprises a bus, a memory connected to the bus, wherein the memory having computer-executable instructions stored therein and a processor unit connected to the bus. The processor unit executes the computer-executable instructions to direct the data processing system to obtain a logical unit number configuration, containing a set of logical unit numbers, determine whether an initiator Internet protocol address, associated with a requester, has a mapping to a logical unit number in the set of logical unit numbers, set routing for an input/output request from the requester to a backing file, according to the mapping, and, return success to the requester.

According to another embodiment a computer-program product for target routing by initiator, using Internet small computer system interface is provided. The computer-program product comprises a computer-readable recordable type medium having computer-executable instructions stored thereon. The computer-executable instructions comprise computer-executable instructions for obtaining a logical unit number configuration, containing a set of logical unit numbers, computer-executable instructions for determining whether an initiator Internet protocol address, associated with a requester, has a mapping to a logical unit number in the set of logical unit numbers, computer-executable instructions for setting a path for an input output request from the requester to a backing file, according to the mapping, and computer-executable instructions for returning success to the requester.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products; according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

Figure 1:
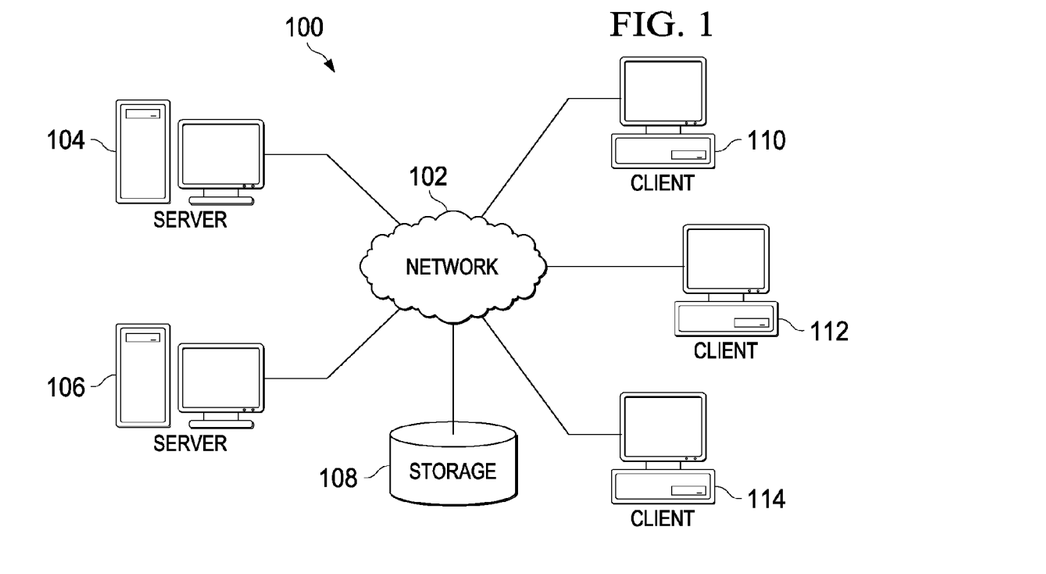
FIG. 1 depicts a pictorial representation of a network of data processing systems in which illustrative embodiments may be implemented.
Figure 2:
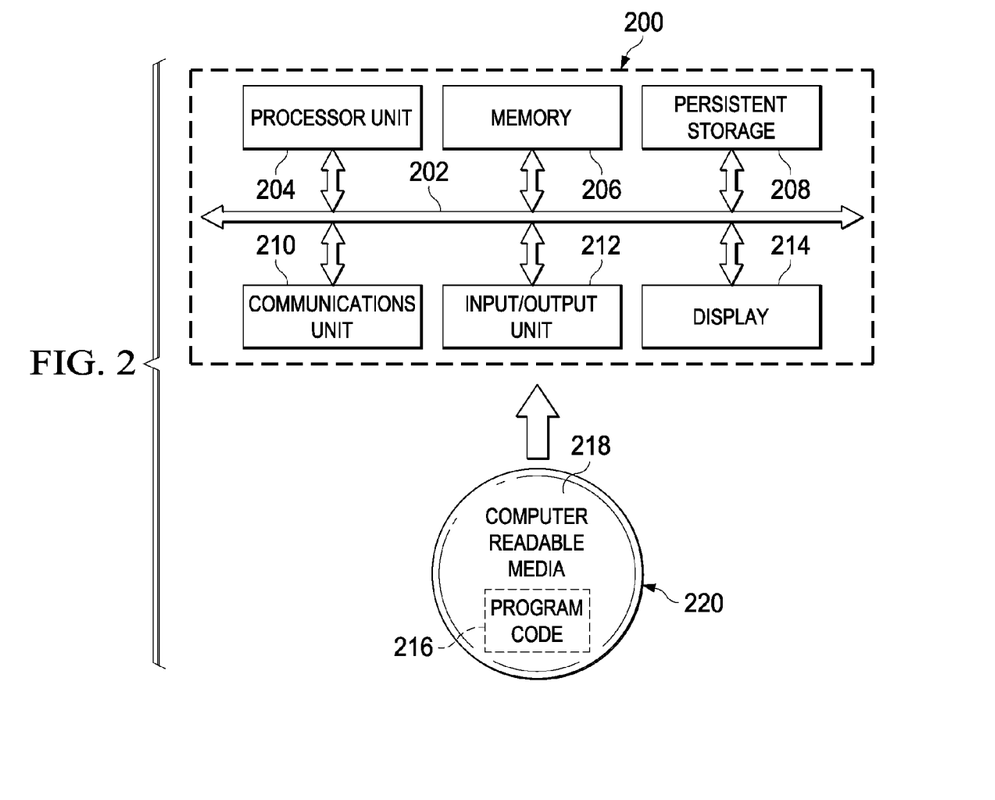
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer-recordable storage medium and downloaded to a data processing system, or other device, for use. For example, program code may be stored on a computer-recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Using system 100 of FIG. 1 as an example, a number of clients such as client 110 and 112 may request access to files contained on storage 108 managed by server 104 through network 102. The requests may be managed through network 102 using target routing by initiator, using Internet small computer system interface.

A computer implemented method executing on server 104 obtains a logical unit number configuration, containing a set of logical unit numbers, and determines whether an initiator Internet protocol address, associated with a requester, such as client 110 and client 112, has a mapping to a logical unit number in the set of logical unit numbers contained on storage 108. Responsive to finding a mapping, sets routing for an input/output/request from the requester of either client 110 or client 112 to a backing file, according to the mapping, and returns success to the requester. The backing file may be a complete file, partial file or a device.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile, or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some, combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
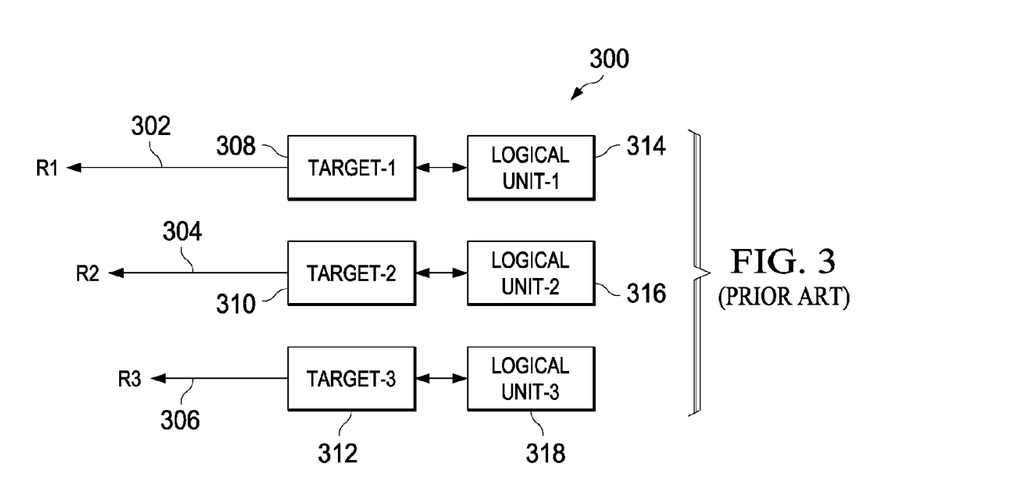
FIG. 3 is a block diagram of a current Internet small computer system interface implementation with multiple requests.

With regard to FIG. 3, a block diagram of a current Internet small computer system interface implementation with multiple requests is presented. The network protocol represented by Internet small computer system interface allows a client to send small computer system interface commands to small computer system interface enabled storage devices. A client then perceives the storage devices as being locally attached devices. Implementation of the Internet small computer system interfaces uses existing transmission control program/Internet protocol based network infrastructures rather than requiring the use of special-purpose wiring.

In the example of an Internet small computer system interface implementation depicted in system 300, clients have sent requests 302, 304 and 306, noted respectively as requests R1, R2, and R3, to Internet small computer system interface targets. A client may be referred to as an Internet small computer system interface initiator. The client is seeking to access a remote device; typically a storage device. The Internet small computer system interface initiator enables the client to access the device over a network.

Targets are shown as target-1 308, target-2 310, and target-3 312. Each represents a storage device that a respective client is seeking to access. The Internet small computer system interface target is a server that exports local storage of the target to be accessed by the Internet small computer system interface initiators using the Internet small computer system interface protocol over the network.

Each client request 302, 304 and 308 is handled by a respective target and resolves to a specific respective device. For example, request 302 is resolved to logical unit-1 314, while request 304 is resolved to logical unit-2 316, and request 306 is resolved to logical unit-3 318. The logical unit is also referred to as a logical unit number (LUN) which represents an individual small computer system interface device that is typically a numbered storage device. Each client or Internet small computer system interface initiator must resolve to a unique target.

Figure 4:
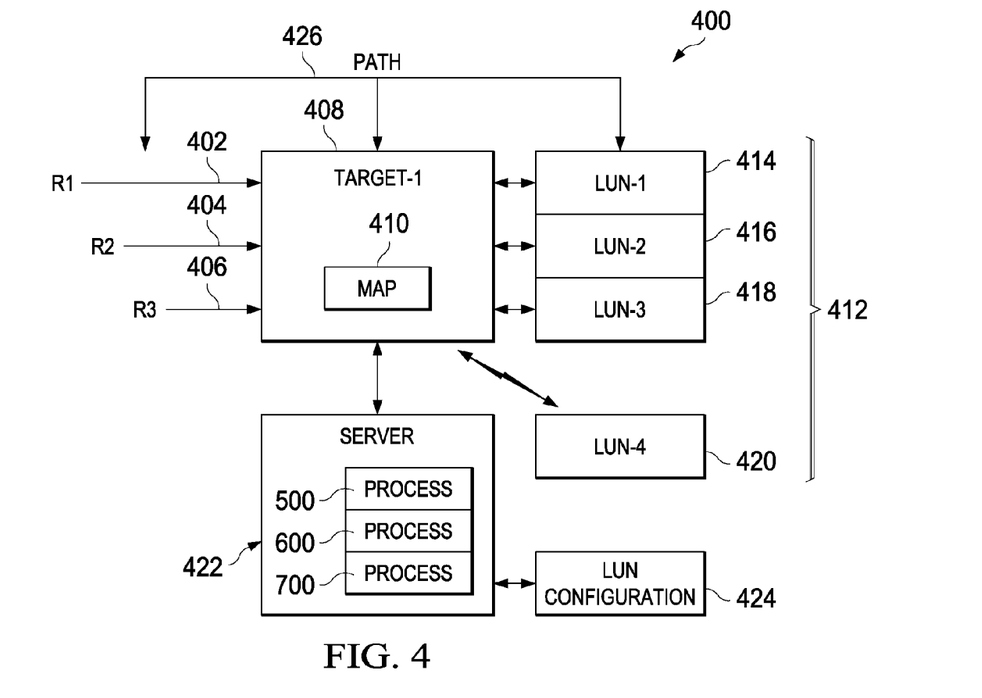
FIG. 4 is a block diagram of an Internet small computer system interface implementation with multiple requests, in accordance with embodiments of the present invention.

With reference to FIG. 4, a block diagram of an Internet small computer system interface implementation with multiple requests, in accordance with embodiments of the present invention, is shown. Similar to FIG. 3, system 400, is an example implementation of an embodiment that may be typically implemented in a combination of hardware and software as a server such as server 104 of system 100 of FIG. 1. The server may be implemented in hardware, software or a combination. Further, system 400 may be implemented in a single physical system or spread across multiple physical systems and still provide the capability described.

A number of client-based requests 402, 404, and 406 are now received by a single target, target-1 408, and mapped to set of logical unit numbers 412. Each request includes an Internet protocol address of the requester, also referred to as an initiator Internet protocol (IP) address or requester Internet protocol (IP) address. Set of logical unit numbers 412 comprises one or more logical unit numbers such as lun-1 414, lun-2 416, lun-3 418 and including a remote device lun-4 420. Set of logical unit numbers 412 comprises a set of backing files. Each backing file may be a complete file, a partial file or a device. Set of logical unit numbers 412 may also be implemented on one device.

Target-1 408 represents an Internet small computer systems interface software implemented target that will support converting device input/output to a mapping of backing files that correspond to the Internet small computer systems interface target's exported device. The Internet small computer systems interface target will utilize supplied device to file mapping information of map 410 to perform the input request to output mapping. Map 410 typically comprises the identifier of the requester and the identifier or "lun" of the desired device. Map 410 is created by a process (described later) executed, for example, on network installation management server 422 using information maintained in "lun" configuration 424. Network installation management server 422 is implemented typically as a set of software applications on a physical device and collectively known as a server. Again, the server may be a separate physical device of combined logically on a physical device with other applications and system utilities. For example, regarding map 410, a requester may have an Internet protocol address of "123" and desires to use device "789." The mapping entry may be expressed as a pair of values "123" and "789." In another example, the device identifier may be expressed as a range of values. Using a single exported target of target-1 408, a number of initiators of the requests 402, 404, and 406 will now open the same target, target-1408. The software-implemented target driver of target-1 408 will map the incoming request based on Internet protocol address or initiator name, using map 410, to a backing file or device of the set of logical unit numbers 412, including logical unit lun-4 420. A single target, target-1 408, now services a number of initiators while allowing each initiator to see a target device specific to that initiator.

Using network installation management as an example, network installation management server 422 is enabled to assign a single software-based target logical unit number from which multiple endpoints could boot and run. In the old model, there was a need to export a target and a "lun" for each device user, or to export one target with a number of "luns," with one "lun" per user for a user managed endpoint. The model today is to export a target and a "lun" for each managed endpoint. A single target and "lun", rather than many targets and "luns", vastly reduces the number of exported objects. In environments that support dynamic discovery of targets, there could be discovery requirements for many targets with the current model. With the described system 400, dynamic discovery would discover only a single target and "lun." In the model of system 400, the Internet small computer system interface disk remains open as long as the endpoint is active. If the backing device is a file, the device may be either a fully or partially-allocated file. The mapping and routing information is used with the specified target and "lun" to route the requests to the correct hacking device or file.

Other embodiments may map the tape or cdrom target to a different tape or cdrom drive based on the requesting initiator or range of initiators. In this example, the Internet small computer system interface software target, target-1 408, would be supplied with mapping or routing information for each initiator that would use the exported target. When a device open request arrives at target-1 408, the target would validate the Internet protocol address of the requesting initiator and enable the proper routing of the initiator to the proper backing object. The backing object could be a real device; or it could be a file.

Using an example of a network installation management environment as an embodiment, network installation management server 422 supplies target-1 408 with the mapping information of map 41.0 necessary for the target to use the proper hacking object for the initiator. Target-1 408 would then route the input/output requests, 402, 404, and 406 to the proper backing device of the set of logical unit numbers 412, using this mapping information. Path 426 is established from request 402 through target-1 408 to backing file or lun-1 414. Path 426 defines the routing from the requester to the backing file.

Figure 5:
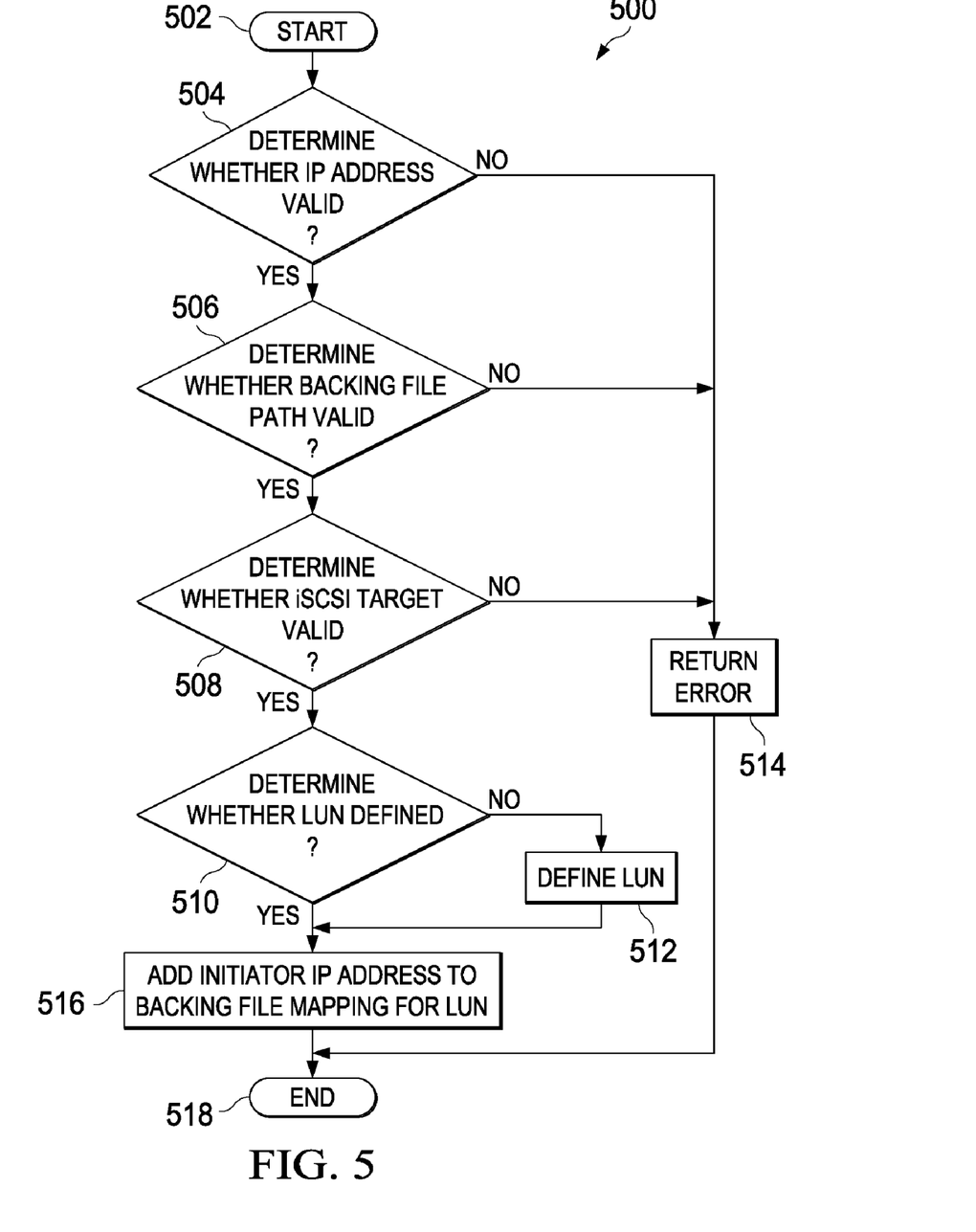
FIG. 5 is a flowchart of a process for configuring an Internet small computer system interface flow, in accordance with illustrative embodiments.

With reference to FIG. 5, a flowchart of a process for configuring an Internet small computer system interface flow, in accordance with illustrative embodiments, is shown. Process 500 is an example of a process for creating entries for map 410 in system 400 of FIG. 4. Process 500 may be implemented in software, hardware or a combination of hardware and software using system 400. For example, process 500 may be implemented on network installation management server 422.

Process 500 begins (step 502) and determines whether the Internet protocol (IP) address is valid (step 504). A validity check may perform known syntactic checks to determine correct format or content. Responsive to a determination the Internet protocol (IP) address is valid, a "yes" is obtained. Responsive to a determination the Internet protocol (IP) address is not valid, a "no" is obtained. When a "no" is obtained in step 504, process 500 skips to step 51.4.

When a "yes" is obtained in step 504, a determination whether the backing file path is valid is performed (step 506). Responsive to a determination the backing file path is valid, a "yes" is obtained. Responsive to a determination the backing file path is not valid, a "no" is obtained. When a "no" is obtained in step 506, process 500 skips to step 514. When a "yes" is obtained in step 506, a determination whether the Internet small computer system interface target is valid is performed (step 508).

Responsive to a determination the Internet small computer system interface target is valid, a "yes" is obtained. Responsive to a determination the Internet small computer system interface target is not valid; a "no" is obtained. When a "no" is obtained in step 508, process 500 skips to step 514. A return error is sent to the requester (step 514) and process 500 terminates (step 518). When a "yes" is obtained in step 508, a determination whether the "lun" is defined is performed (step 510).

Responsive to a determination the "lun" is defined, a "yes" is obtained. Responsive to a determination the "lun" is not defined, a "no" is obtained. When a "no" is obtained in step 510, an operation is performed to define the "lun" (step 512). When a "yes" is obtained in step 510, add Internet protocol address to backing file mapping for "lun" is performed (step 516), with process 500 terminating thereafter (step 518).

Figures 6, 7:
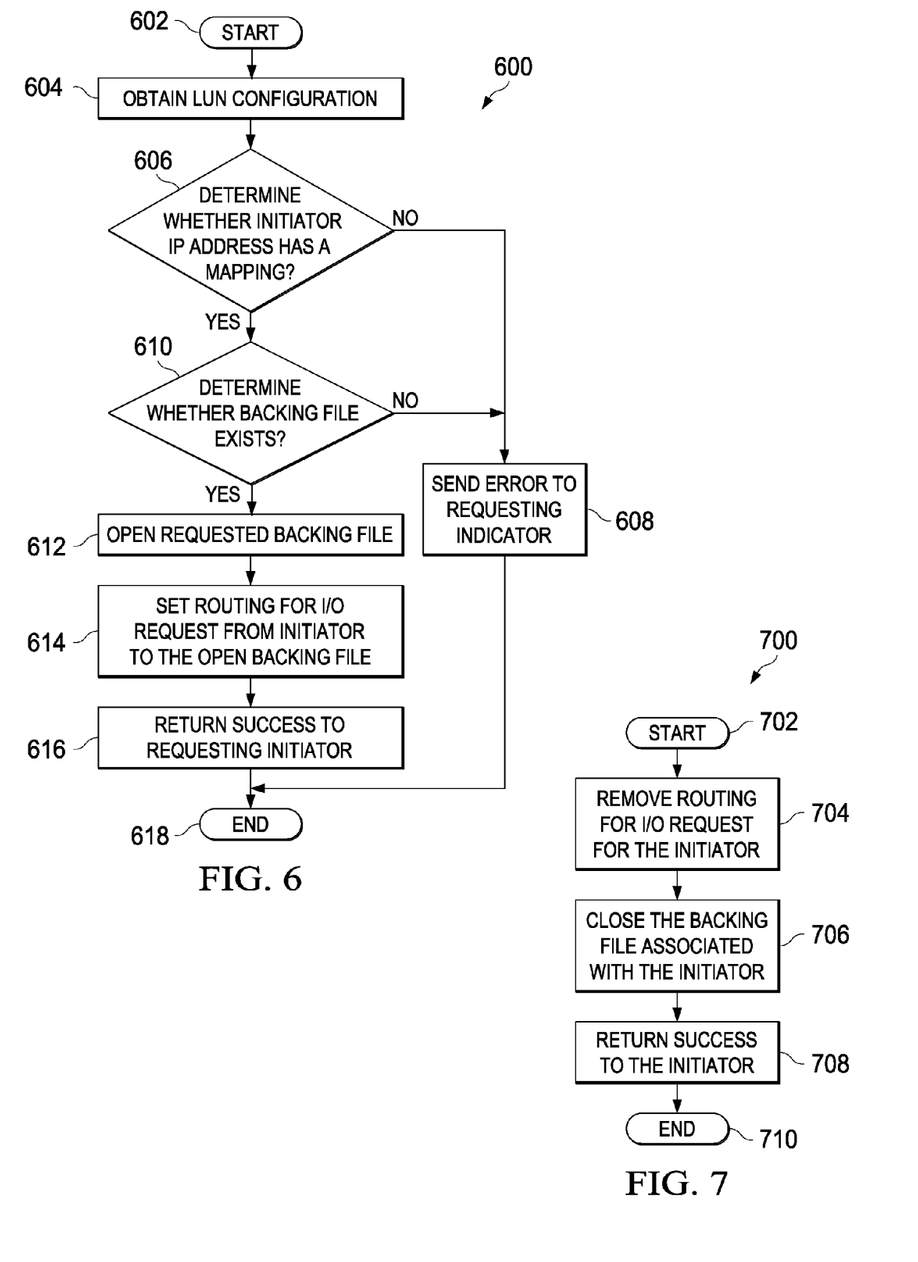
FIG. 6 is a flowchart of a process to open a device path, in accordance with embodiments of the present invention.
FIG. 7 is a flowchart of a process to close a device path, in accordance with embodiments of the present invention.

With reference to FIG. 6, a flowchart of a process to open a device path, in accordance with embodiments of the present invention, is shown. Process 600 is an example of using map 410 of FIG. 4 to establish a connection path between a requester and device. Process 600 is typically performed by a server, for example network installation management server 422 of FIG. 4, Process 600 begins (step 602) and obtains a "lun" configuration (step 604). The configuration information may be obtained using Internet-based naming services as part of the Internet small computer system interface support implementation. The configuration contains a set of logical unit numbers that are supported. A determination is made as to whether an initiator Internet protocol address has a mapping (step 606). The mapping information provides a correspondence between the initiators or requesters and the desired "luns." The determination is made by accessing the mapping information provided by map 410 of FIG. 4. When an initiator Internet protocol address has a mapping, a "yes" is obtained. When an initiator Internet protocol address does not have a mapping, a "no" is obtained.

When a "no" is obtained in step 606, process 600 sends an error to the requesting initiator (step 608) and terminates thereafter (step 618). When a "yes" is obtained in step 606, a determination as to whether the backing file exists is performed (step 610). The backing file is the file requested by the requesting initiator and is the only file the initiator is allowed to access. When the backing file requested exists, a "yes" is obtained. When the requested backing file does not exist, a "no" is obtained.

When a "no" is obtained in step 610, process 600 sends an error to the requesting initiator (step 608) and terminates thereafter (step 618). When a "yes" is obtained in step 610, open requested backing file is performed (step 612). The open operation makes the requested file information available to the requester. Set path for the input/output (I/O) request from the initiator to the open backing file is performed (step 614). The routing establishes the path through which requests flow between the device and the requester.

Return success to requesting initiator is performed (step 616). The operation informs the requester of success in that the requested device has been found and made available for use. Process 600 terminates thereafter (step 618). Had process 600 encountered an error before, an error would have been returned to the requester as previously indicated.

With reference to FIG. 7, a flowchart of a process to close a device path, in accordance with embodiments of the present invention, is shown. Process 700 is an example of closing a device path that was opened using the mapping information of map 410 of FIG. 4. Process 700 is performed typically by a server, for example network installation management server 422 of FIG. 4, at the end of use of a device by a requester. Process 700 begins (step 702) and removes routing for input output (I/O) request for the initiator (step 704). The removal of the routing eliminates the path between the requester initiator and the device. Close the backing file associated with the initiator is performed (step 706). Closing the backing file completes the closure of the file in the file system, allowing others to access the file as needed.

Return success to the initiator is performed (step 708) with process 700 terminating thereafter (step 710). Success indicates to the requester the completion of the file closure process and removal of all file access information.

Illustrative embodiments thus provide a capability to map multiple file access requests from multiple requesters for multiple files through an Internet protocol network to multiple devices through the service of a single target server. Each requester is served with a view that each requester has a unique target providing access to specific files or devices while typically reducing the need to manage as many targets and "luns" as previously required. The capability to service through a single target server reduces the requirement to manage many unique targets. Further the capability to support complete or partial files was well as devices reduces the need for separate physical devices by mapping to allocated portions of devices in the case of file use.

The flowchart and block diagrams in the figures illustrate the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/Output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for target routing by initiator, using Internet small computer system interface, the computer-implemented method comprising:
    obtaining a logical unit number configuration containing a plurality of logical unit numbers;
    generating an Internet small computer system interface software target for a plurality of requesting devices to form a single target;
    routing a plurality of input/output requests received at the Internet small computer system interface from the plurality of requesting devices to the single target;
    responsive to receiving an input/output request having an Internet protocol address associated with a requesting device in the plurality of requesting devices, mapping the Internet protocol address associated with the requesting device to a logical unit number in the plurality of logical unit numbers to form a mapping; and
    setting, at the single target, a path for the input/output request from the requesting device to a backing file based on the mapping between the Internet protocol address associated with the requesting device and the logical unit number, wherein the Internet protocol address associated with the requesting device is included in the path to the backing file.

2. The computer-implemented method of claim 1, wherein setting the path for the input/output request from the requesting device to the backing file further comprises:
    determining whether the backing file exists; and
    opening the backing file, responsive to determining that the backing file exists.

3. The computer-implemented method of claim 1, further comprising:
    mapping an Internet protocol address associated with a second requesting device to a second logical unit number in the plurality of logical unit numbers.

4. The computer-implemented method of claim 1, further comprising:
    determining whether the Internet protocol address is valid;
    determining whether a backing file path is valid, responsive to a determination that the Internet protocol address is valid;
    determining whether a Internet small computer system interface target is valid, responsive to a determination that the backing file path is valid;
    determining whether the logical unit number is defined, responsive to a determination Internet small computer system interface target is valid; and
    adding the Internet protocol address to backing file correspondence for the logical unit number to create the mapping, responsive to a determination logical unit number is defined.

5. The computer-implemented method of claim 1, further comprising:

removing the path for the input/output request for the requesting device;
closing the backing file associated with the requesting device; and
returning success to the requesting device.

6. The computer-implemented method of claim 1, wherein the backing file is a device.

7. The computer-implemented method of claim 1, wherein the backing file is one of a complete file and a partial file.

8. A data processing system for target routing by initiator, using Internet small computer system interface, the data processing system comprising:
a bus;
a memory connected to the bus, wherein the memory having computer-executable instructions stored therein;
a processor unit connected to the bus, wherein the processor unit executes the computer-executable instructions to:
obtain a logical unit number configuration containing a plurality of logical unit numbers;
generate an Internet small computer system interface software target for a plurality of requesting devices to form a single target;
route a plurality of input/output requests received at the Internet small computer system interface from the plurality of requesting devices to the single target;
map an Internet protocol address associated with a requesting device to a logical unit number in the plurality of logical unit numbers in response to receiving an input/output request having an Internet protocol address associated with the requesting device in the plurality of requesting devices to form a mapping; and
set, at the single target, a path for the input/output request from the requesting device to a backing file based on the mapping between the Internet protocol address associated with the requesting device and the logical unit number, wherein the Internet protocol address associated with the requesting device is included in the path to the backing file.

9. The data processing system of claim 8, wherein, in executing the the computer-executable instructions to set the path for the input/output request from the requesting device to the backing file, the processor unit further executes the computer-executable instructions to:
determine whether the backing file exists; and
open the backing file, responsive to determining that the backing file exists.

10. The data processing system of claim 8, wherein the processor unit further executes the computer-executable instructions to:
map an Internet protocol address associated with a second requesting device to a second logical unit number in the plurality of logical unit numbers.

11. The data processing system of claim 8, wherein the processor unit further executes the computer-executable instructions to:
determine whether the Internet protocol address is valid;
determine whether a backing file path is valid, responsive to a determination that the Internet protocol address is valid;
determine whether a Internet small computer system interface target is valid, responsive to a determination that the backing file path is valid;
determine whether the logical unit number is defined, responsive to a determination Internet small computer system interface target is valid; and
add the Internet protocol address to backing file correspondence for the logical unit number to create the mapping, responsive to a determination logical unit number is defined.

12. The data processing system of claim 8, wherein the processor unit further executes the computer-executable instructions to:
remove the path for input the output request for the requesting device;
close the backing file associated with the requesting device; and
return success to the requesting device.

13. The data processing system of claim 8, wherein the backing file is a device.

14. The data processing system of claim 8, wherein the backing file is one of a complete file and a partial file.

15. A computer-program product for target routing by initiator, using Internet small computer system interface, the computer-program product comprising:
a computer-readable storage device having computer-executable instructions stored thereon, the computer-executable instructions comprising:
computer-executable instructions for obtaining a logical unit number configuration containing a plurality of logical unit numbers;
computer-executable instructions for generating an Internet small computer system interface software target for a plurality of requesting devices to form a single target;
computer-executable instructions for routing a plurality of input/output requests received at the Internet small computer system interface from the plurality of requesting devices to the single target;
computer-executable instructions for mapping, responsive to receiving an input/output request having an Internet protocol address associated with a requesting device in the plurality of requesting devices, the Internet protocol address associated with the requesting device to a logical unit number in the plurality of logical unit numbers to form a mapping; and
computer-executable instructions for setting, at the single target, a path for an input/output request from the requesting device to a backing file based on the mapping between the Internet protocol address associated with the requesting device and the logical unit number, wherein the Internet protocol address associated with the requesting device is included in the path to the backing file.

16. The computer-program product of claim 15, wherein the computer-executable instructions for setting the path for the input/output request from the requesting device to the backing file further comprises:
computer-executable instructions for determining whether the backing file exists; and
computer-executable instructions for opening the backing file, responsive to determining that the backing file exists.

17. The computer-program product of claim 15 further comprising:
computer-executable instructions for mapping an Internet protocol address associated with a second requesting device to a second logical unit number in the plurality of logical unit numbers.

18. The computer-program product of claim 15, further comprising:
computer-executable instructions for determining whether the Internet protocol address is valid;

computer-executable instructions for determining whether a backing file path is valid, responsive to a determination that the Internet protocol address is valid;

computer-executable instructions for determining whether a Internet small computer system interface target is valid, responsive to a determination that the backing file path is valid;

computer-executable instructions for determining whether the logical unit number is defined, responsive to a determination Internet small computer system interface target is valid; and computer-executable instructions for adding the Internet protocol address to backing file correspondence for the logical unit number to create the mapping, responsive to a determination logical unit number is defined.

19. The computer-program product of claim 15, further comprising:
computer-executable instructions for removing the path for input the output request for the requesting device;
computer-executable instructions for closing the backing file associated with the requesting device; and
computer-executable instructions for returning success to the requesting device.

20. The computer-program product of claim 15, wherein the backing file is one of a device, a complete file and a partial file.

* * * * *